United States Patent [19]

Chretien

[11] Patent Number: 4,810,839
[45] Date of Patent: Mar. 7, 1989

[54] MULTIFUNCTIONAL ELECTRIC SWITCH AND CONTROL LEVER

[75] Inventor: Louis J. Chretien, Eragny S/Oise, France

[73] Assignee: Jaeger, Levallois Perret, France

[21] Appl. No.: 125,383

[22] Filed: Nov. 25, 1987

[30] Foreign Application Priority Data

Dec. 3, 1986 [FR] France .................. 86 16930

[51] Int. Cl.⁴ .................. H01H 9/00; B60Q 1/00
[52] U.S. Cl. .................. 200/4; 200/61.27; 200/61.54
[58] Field of Search .......... 200/4.5 R, 61.27, 61.3, 200/61.34, 61.35, 61.54

[56] References Cited

U.S. PATENT DOCUMENTS

| | | | |
|---|---|---|---|
| 4,149,048 | 4/1979 | Winter et al. | 200/4 X |
| 4,204,099 | 5/1980 | Cryer | 200/4 |
| 4,206,325 | 6/1980 | Wilkinson | 200/4 |
| 4,238,650 | 12/1980 | Cryer | 200/4 |
| 4,245,137 | 1/1981 | Hirai et al. | 200/4 |
| 4,273,971 | 6/1986 | Tregurtha | 200/4 X |
| 4,293,743 | 10/1981 | Iwata et al. | 200/61.54 X |
| 4,315,117 | 2/1982 | Kokubu et al. | 200/61.54 X |
| 4,379,954 | 4/1983 | Iwata et al. | 200/61.54 X |
| 4,393,280 | 7/1983 | Iwata et al. | 200/61.54 X |
| 4,748,298 | 5/1988 | Chretien | 200/12 |

FOREIGN PATENT DOCUMENTS 83272 12/1964 France .
1432008 12/1966 France .
2597659 10/1987 France .

Primary Examiner—J. R. Scott
Attorney, Agent, or Firm—Fleit, Jacobson, Cohn & Price

[57] ABSTRACT

The present invention relates to an electrical switch of the type comprising a housing provided with a plurality of electrical contacts and carrying a control lever (300) capable of being displaced in rotation about its longitudinal axis (302) and about two transverse axes (210 and 220) in order to perform first, second, and third switching functions respectively when the lever rotates. According to the invention, the switch includes a ball (200) mounted to pivot inside the housing about the two transverse axes (210 and 220), with the ball (200) having a through channel (240) in which the lever (300) is received free to rotate abouts its longitudinal axis (302), the switch further including a clevis (400) mounted on the ball (200) to follow the ball when it pivots about the secondary axis (220) while allowing the ball (200) to pivot relative to the clevis (400) when the ball (200) is caused to pivot about the main axis (210). The lever is also preferentially capable of translation parallel to its longitudinal axis in order to operate a fourth switching function.

11 Claims, 4 Drawing Sheets

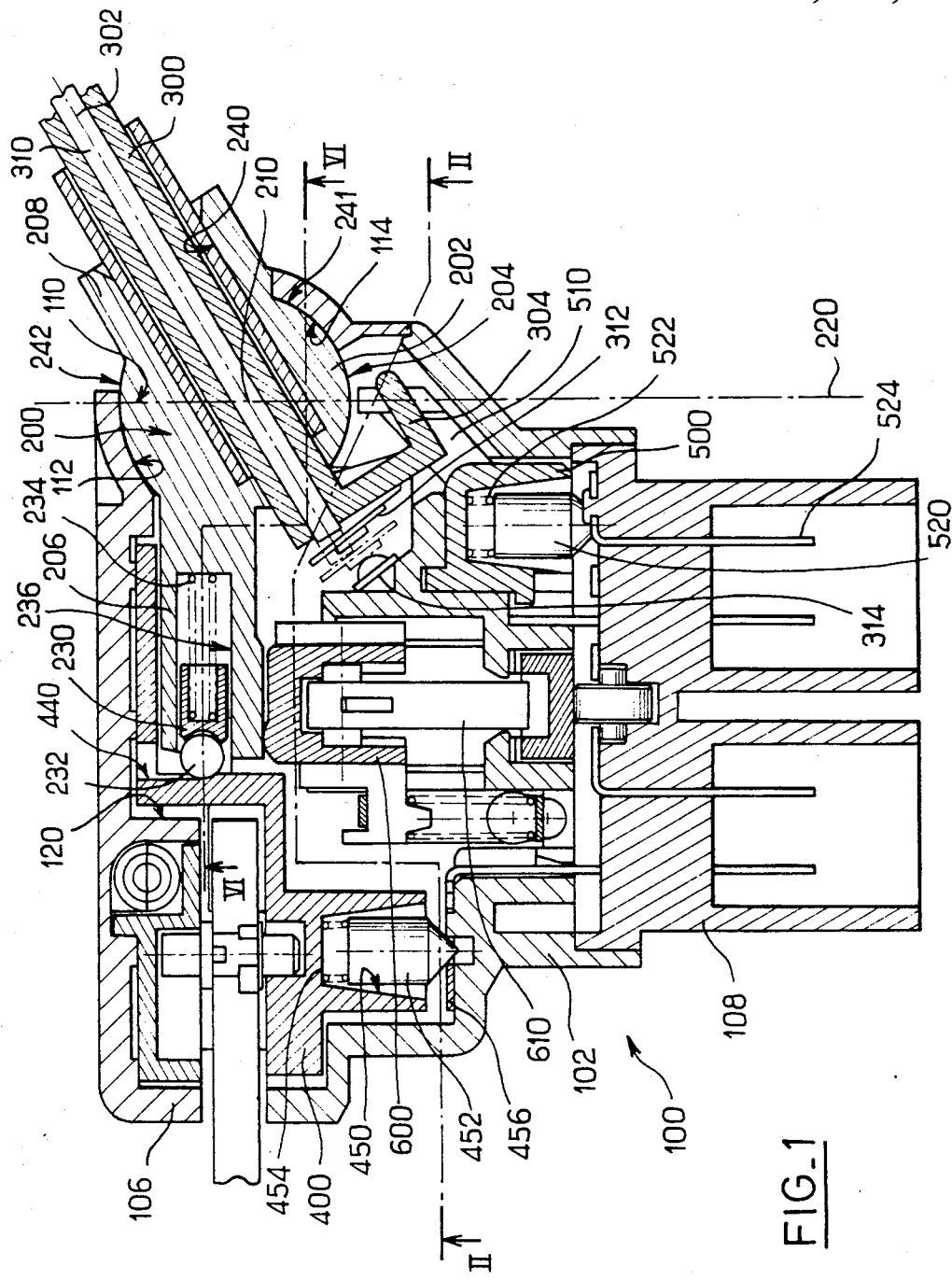
FIG_1

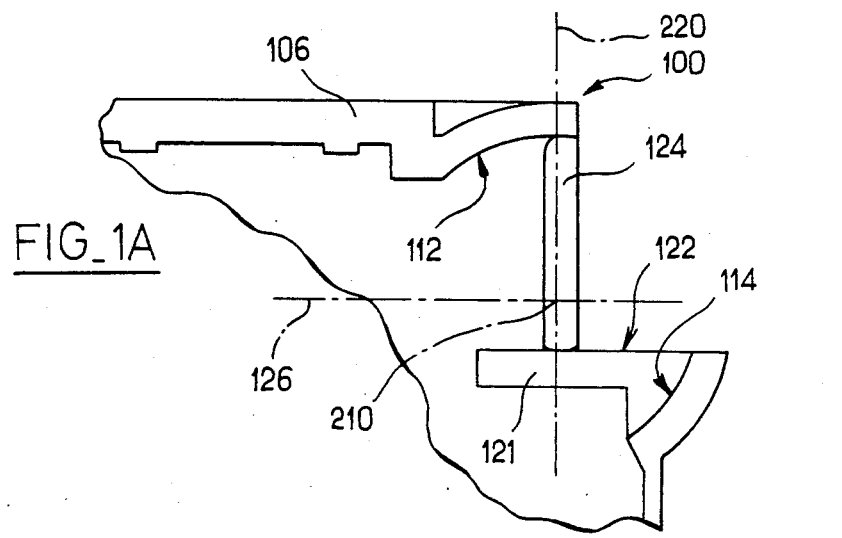
FIG_1A
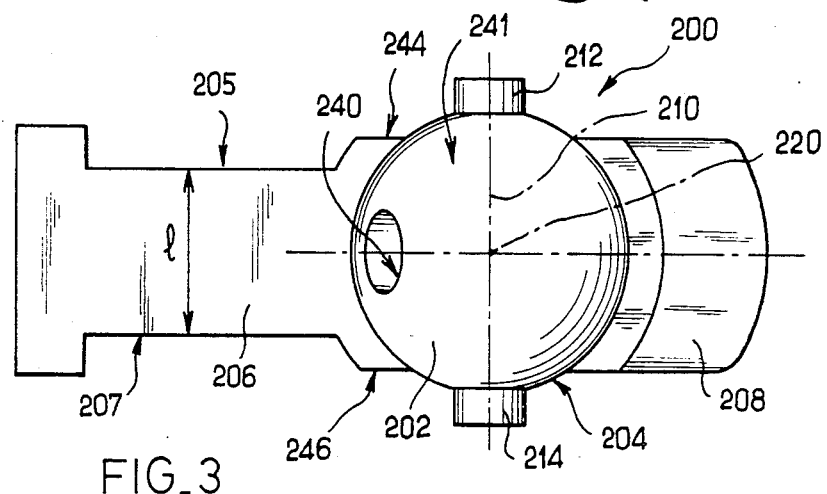
FIG_3
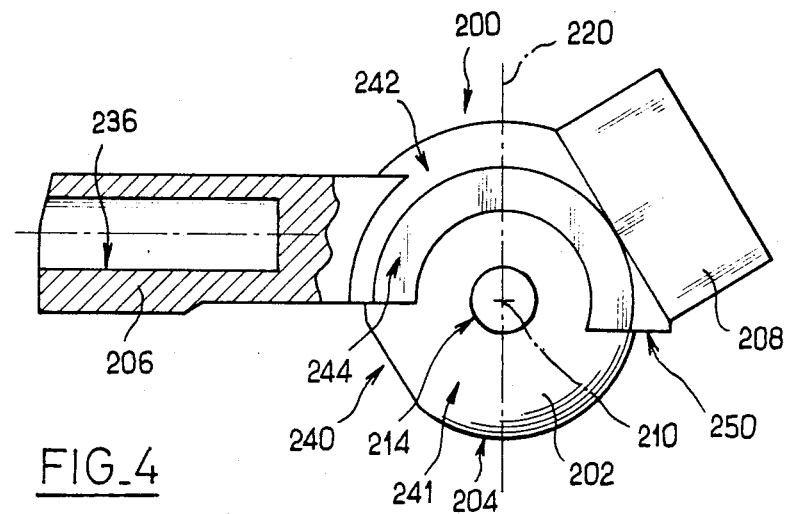
FIG_4

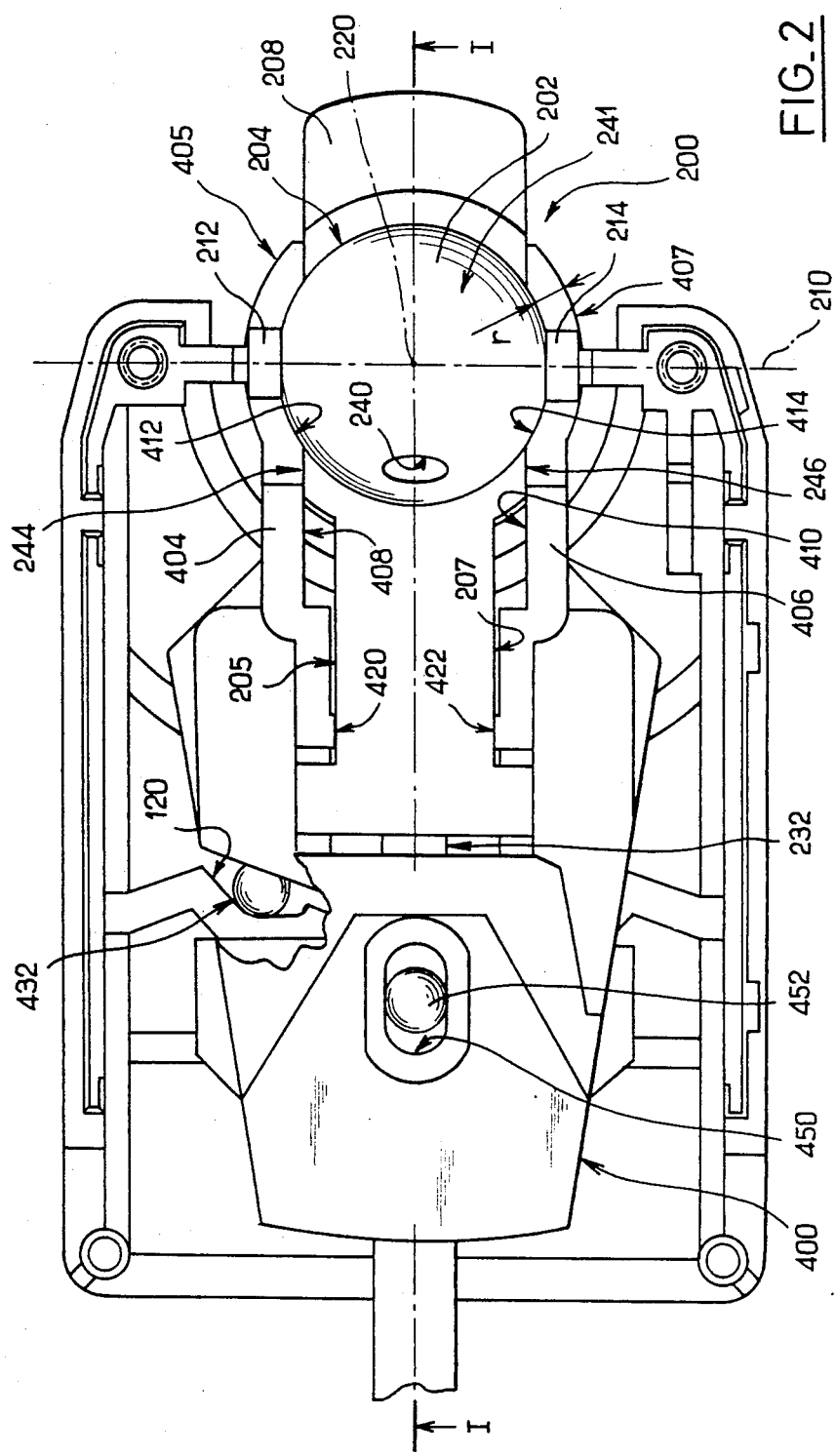
FIG._2

1

MULTIFUNCTIONAL ELECTRIC SWITCH AND CONTROL LEVER

The present invention relates to electrical switches, in particular for motor vehicles.

FIELD OF THE INVENTION

The present invention relates more precisely to electrical switches of the type comprising a housing provided with a plurality of electrical contacts and having a control lever, in which the control lever is capable of being displaced in rotation about its longitudinal axis in order to operate a first action on the electrical contacts in order to perform a first function, the control lever being capable of being displaced by pivoting about a main axis extending transversely to its longitudinal axis in order to operate a second action on the eletrical contacts in order to perform a second function, and the control lever being capable of being displaced by pivoting about a secondary axis which is transversal both to its longitudinal axis and to the main axis in order to operate a third action on the electrical contacts in order to perform a third function.

BACKGROUND OF THE INVENTION

Numerous switches of this type have already been proposed.

Such switches are described and shown, for example, in the following patents: U.S. Pat. Nos 4,293,743, 4,379,954, and 4,393,280.

The switches described in the above-mentioned documents comprise a housing, a rotary element, a yoke, and a control lever. The rotary element is mounted to pivot relative to the housing about the secondary axis in order to operate the above-specified third function. The yoke is mounted on the rotary equipment to pivot about the main axis in order to operate the above-mentioned second function. Finally, the control lever is engaged in a channel passing through the yoke and is free to rotate in said channel about its own longitudinal axis in order to operate the above-mentioned first function.

Switches of the above type have given good service.

However, the Applicant has observed that these switches suffer from non-negligible operating backlash.

The aim of the present invention is to improve switches of the type indicated in the introduction above, in particular by reducing the backlash therein.

SUMMARY OF THE INVENTION

According to the present invention, this aim is achieved by an electrical switch of the type mentioned in the introduction above and characterized by the fact that it includes a ball mounted to pivot relative to the housing about two transverse axes corresponding respectively to the main axis and to the secondary axis, the ball having a through channel receiving the lever and leaving it free to rotate about its own longitudinal axis which extends transversely relative to the main pivot axis and to the secondary pivot axis of the ball, the switch also including a clevis carried by the ball to follow the ball when it pivots about the secondary axis while allowing the ball to pivot relative to the clevis when the ball is displaced to pivot about the main axis.

According to another advantageous characteristic of the invention, the housing is provided with a bearing having a spherical envelope and guiding the ball to pivot about the secondary axis and the main axis while a resilient member urges the ball against said bearing.

Advantageously, the resilient member urging the ball to press against the spherical bearing also presses against a member which provides an indexing function for the clevis and the ball when they pivot together about the secondary axis.

Preferably, the ball has at least one stub axle which is coaxial with the main axis, and the clevis is engaged over the stub axle in order to follow the ball when it pivots about the secondary axis while allowing relative pivoting to take place between the ball and the clevis when the ball is rotated about the main axis.

More precisely, and preferably, the ball has two diametrically opposite stub axles which are coaxial with the main axis and on which the clevis is engaged.

According to another advantageous characteristic of the present invention, the switch includes resilient means interposed between the clevis and the ball in order to provide an indexing function between the clevis and the ball when the ball is made to pivot about the main axis.

Advantageously, the lever is also capable of translation parallel to its longitudinal axis in order to operate a fourth function.

In a preferred but non-limiting manner, rotation of the lever about its longitudinal axis serves to select between the following lighting conditions: off, sidelights; and headlights; with pivoting of the ball about the main axis interchanging between main beam and dipped beam; and with pivoting of the ball about the secondary axis controlling the direction indicator lights.

BRIEF DESCRIPTION OF THE DRAWINGS

An embodiment of the invention is described by way of example with reference to the accompanying drawings, in which:

FIG. 1 is a diagrammatic longitudinal section through a switch in accordance with the present invention on a section plane shown diagrammatically by reference I—I in FIG. 2;

FIG. 1A shows a detail in a view similar to FIG. 1;

FIG. 2 is a view from beneath of the essential components of a switch in accordance with the present invention seen on non-coplanar planes indicated by reference II—II in FIG. 1;

FIG. 3 is a view from beneath of the ball of an electrical switch in accordance with the present invention seen in a view similar to FIG. 2;

FIG. 4 is a side view in partial section of the same ball in a view similar to the section plane of FIG. 1;

DETAILED DESCRIPTION

Figure 5:
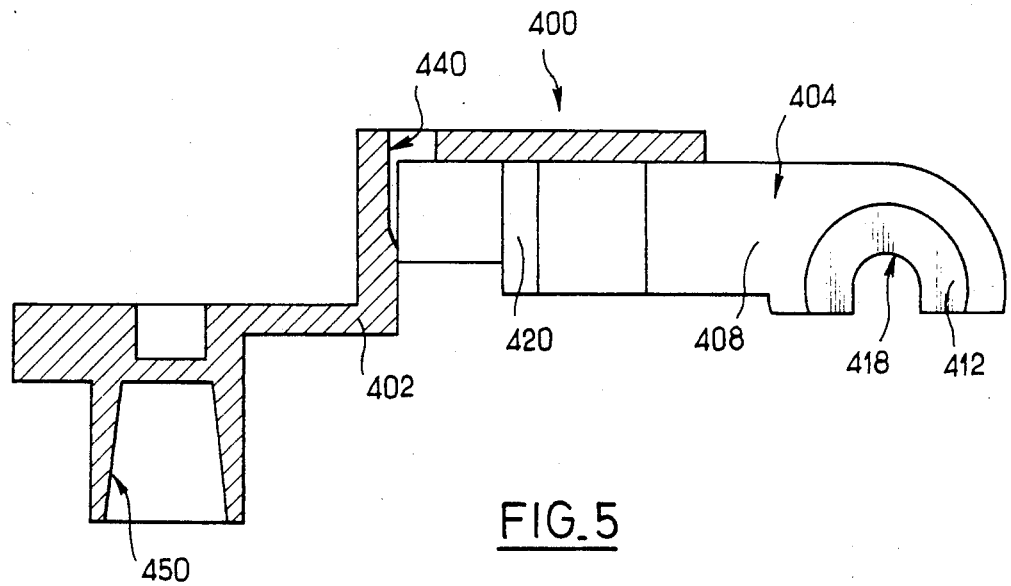
FIG. 5 is a view of the clevis of an electrical switch in accordance with the present invention on a section plane similar to that of FIG. 1.
Figure 6:
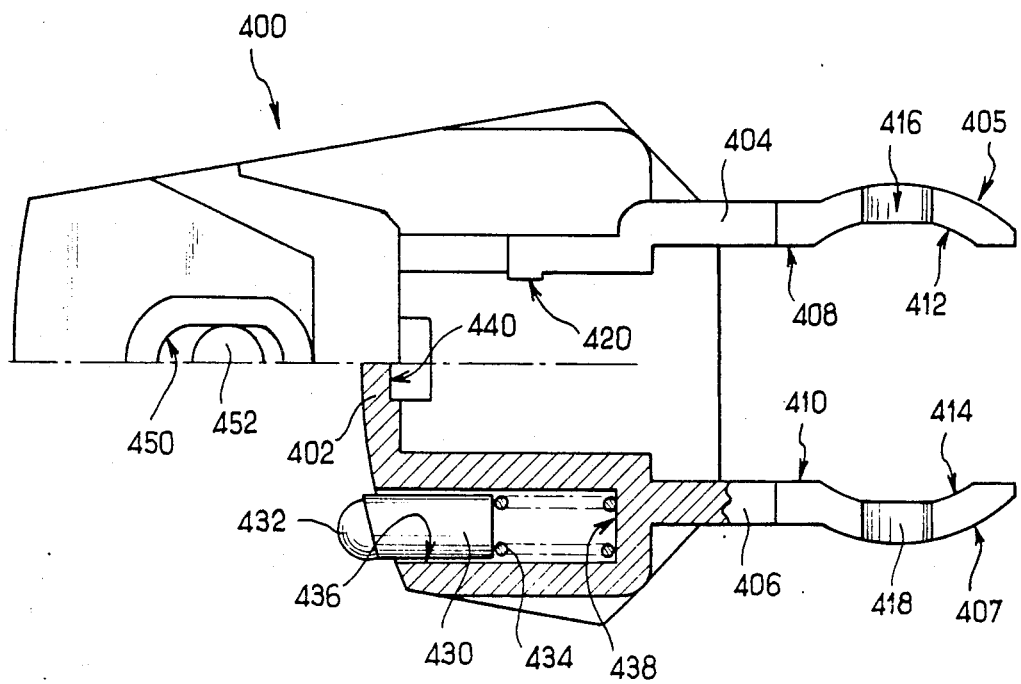
FIG. 6 shows the clevis of an electrical switch in accordance with the present invention; more precisely, the top half of FIG. 6 shows the underside of the clevis in a manner similar to FIG. 2, whereas the bottom half of FIG. 6 shows the clevis in section on non-coplanar section planes indicated by reference VI—VI in FIG. 1.

The accompanying figures show an electrical switch comprising a housing 100, a ball 200, a control lever 300, and a clevis 400.

In the embodiment shown in the figures, the housing 100 is formed by an intermediate body 102 and two cover plates 106 and 108.

The ball 200 comprises a central body 202 whose outside surface 204 is spherical. The ball 200 also includes a control finger 206 and a sleeve 208 both of which are fixed to the central body 202 and which are substantially diametrically opposite each other.

The spherical central body 202 of the ball rests against a bearing 110 having a spherical envelope and provided in the cover plate 106 of the housing.

More precisely, the bearing 110 has spherical surfaces referenced 112 and 114 in FIG. 1.

It will be observed, on examining this figure, that the bearing 110 surrounds the central body 202 of the ball only over a portion of its periphery, and more precisely it surrounds regions thereof which are diametrically opposite about the center of the central body 202.

The bearing 110 guides the ball 200 to allow it to pivot about two axes 210 and 220 which are respectively referred to as the "main" axis and the "secondary" axis.

The main axis 210 extends parallel to the plane of FIG. 2 and perpendicularly to the section of FIG. 1. The secondary axis 220 extends parallel to the section of FIG. 1 and perpendicularly to the plane of FIG. 2.

The clevis 400 comprises a base 402 and two tines 404 and 406.

The tines 404 and 406 extend generally parallel to each other and to the section plane of FIG. 1. They project from the same end of the base 402.

The free ends of the tines 404 and 406 furthest from the base 402 are provided with first thrust bearing surfaces 412 and 414 on their facing inner surfaces 408 and 410.

The first bearing surfaces 412 and 414 which face each other are defined by concave spherical surfaces which are complementary to the outside surface 204 of the central body 202 of the ball.

Further, the tines 404 and 406 are provided with second thrust bearing surfaces 416 and 418. The second thrust bearing surfaces 416 and 418 open out to a common side face of the tines 404 and 406. The important point about the second thrust bearing surfaces 416 and 418 is that they are each defined by a concave part-cylinder which is complementary to the cylindrical envelope of a corresponding stub axle 212 or 214 projecting from the central body 202 of the ball 200.

The stub axles 212 and 214 are diametrically opposite, mutually coaxial, and also coaxial with the main axis 210.

Finally, the clevis 400 is provided with third thrust bearing surfaces 420 and 422. The third thrust bearing surfaces 420 and 422 are defined on the above-mentioned facing inside surfaces 408 and 410 of the tines 404 and 406. The third thrust bearing surfaces 420 and 422 are mutually parallel and are parallel to the section plane I—I shown in FIG. 2.

The distance between the third thrust bearing surfaces 420 and 422 corresponds to the width marked 1 on FIG. 3 of the control finger 206 which is fixed to the ball 200.

It may be observed that the third thrust bearing surfaces 420 and 422 extend perpendicularly to the main axis 210.

When the clevis 400 is engaged on the ball 200, the first thrust bearing surfaces 412 and 414 rest against the spherical outside surface 204 of the ball 200; the second thrust bearing surfaces 416 and 418 rest on the stub axles 212 and 214 of the ball; and the third thrust bearing surfaces 420 and 422 rest against the side surfaces 205 and 207 of the control finger 206. Thus, the clevis 400 continually follows the ball 200 as it pivots about the secondary axis 220, while still allowing relative pivoting to occur between the ball 200 and the clevis 400 when the ball 200 is pivoted about the main axis 210.

When the ball is pivoted about the main axis 210, the third thrust bearing surfaces 420 and 422 slide over the side surfaces 205 and 207 of the control finger 206. Similarly the stub axles 212 and 214 are capable of pivoting within the second thrust bearing surfaces 416 and 418, while the spherical outside surface 204 of the ball is capable of pivoting in the first thrust bearing surfaces 412 and 414.

However, when the ball 200 is rotated about the secondary axis 220, the side surfaces 205 and 207 rest against the third thrust bearing surfaces 420 and 422 and thereby provide a link between the ball 200 and the clevis 400.

The clevis 400 is provided with indexing means for indexing its position relative to the housing 100 as it pivots about the secondary axis 220.

These indexing means are essentially constituted by an indexing stud 430, optionally fitted with a wheel 432, and resiliently urged by a spring 434 against a cam-forming indexing surface 120 in FIG. 2 which is fixed to the housing 100.

The indexing stud 430 is received in a blind bore 436 provided in the clevis 400. The spring 434 is inserted between the bottom 438 of the blind bore 436 and the stud 430.

It is preferable for the means which serve to index the clevis 400 relative to the housing 100 during pivoting about the secondary axis 220 to be symmetrical about the section plane of FIG. 1 which is referenced I—I in FIG. 2.

Because of this, and preferably, two blind bores 436 are provided symmetrically about the section plane I—I and each of them receives an indexing stud 430 provided with a wheel 432 and urged against the indexing surface 120 by a spring 434.

The indexing surface 120 provided on the housing 100 faces the body 202 of the ball 200. However, the blind bores 436 provided in the clevis 400 and receiving the springs 434 together with the indexing studs 430 open out away from the body 202 of the ball 200.

Thus, the person skilled in the art will readily understand from an examination of the accompanying figures that the springs 434 which urge the clevis 400 away from the indexing surface 120 urge the ball 200 against the spherical bearing surfaces 110 facing indexing surface 120 by means of the engagement of the second thrust bearing surfaces 416 and 418 against the stub axles 212 and 214 which are fixed to the ball 200.

Thus, by virtue of the resilient urging applied to the body 202 of the ball 200 by the springs 434, the ball 200 rotates about the main axis 210 and the secondary axis 220 in a manner which is quite free from backlash. This is an essential characteristic of the invention.

Further, by using the springs 434 both as the means for urging the ball 200 to take up slack and as the means for providing indexing of the clevis 400 as it pivots about the secondary axis 220 it becomes possible to obtain a structure which is simple, compact, and cheap.

Naturally, other means could be provided for resiliently urging the ball 200 against the spherical bearing surface 110.

In a manner which is conventional per se, the above-mentioned indexing wheel 432 pivots relative to the indexing studs 430 about axes which are parallel to the secondary axis 220.

Means are also provided for indexing the ball 200 relative to the clevis 400 when the ball 200 pivots about the main axis 210.

These indexing means include an indexing stud 230 carrying a wheel 232 and urged by a drive spring 234 against an indexing surface 440 provided on the clevis 400.

The stud 230 and the spring 234 are received in a blind bore 236 provided in the control finger 206. The bore 236 opens out away from the body 202 of the ball 200 opposite the associated indexing surface 440.

The body 202 of the ball and the sleeve 208 have a bore 240 passing therethrough which is coaxial with the sleeve 208. The bore 240 receives the control lever 300 and leaves it free to rotate about its own longitudinal axis 302.

To sum up, the ball 200 is pivotally mounted in the housing 100 to rotate about two transverse axes 210 and 220 respectively referred to as the main axis and as the secondary axis.

The ball 200 receives the lever 300 and leaves it free to rotate about its longitudinal axis 302 which is generally transverse to both the main pivot axis 210 and to the secondary pivot axis 220 of the ball.

Finally, the clevis 400 is carried by the ball 200 in order to follow the pivoting of the ball about its secondary axis 220 while allowing relative pivoting to take place between the ball 200 and the clevis 400 when the ball 200 is pivoted about the main axis 210.

The control lever 300 is provided with an off-center peg 304. The peg is engaged in a fork 510 which is fixed to a slide 500.

The slide is guided in translation relative to the housing 100 and parallel to the main axis 210.

The slide 500 carries at least one contact stud 520 which is resiliently urged by a spring 522 against a set of fixed electrically conducting blades given an overall reference 524.

Rotating the control lever 300 about its longitudinal axis 302 causes the slide 500 to move in translation parallel to the main axis 210 under drive from the off-center peg 304 trasnsmitted via the fork 510, and as a result the contact stud 520 moves over the blades 524, thereby changing the electrical connection conditions between the blades.

The blades 524 mounted on the housing 100 may be adapted so that the slide 500 and the contact stud 520 select different forms of lighting as they move parallel to the main axis 210, for example and in succession: off, sidelights only; headlights and sidelights. This may be done by interconnecting various different pairs of electrically conductive blades 524.

The control finger 206 rests against a crosshead 600. The crosshead 600 is guided in translation relative to the housing 100 parallel to the secondary axis 220. The crosshead 600 is urged to press against the control finger 206 by springs which are not shown in the figures in order to simplify the illustration.

Moving the control lever 300 about the main axis 210 simultaneously pivots the ball 200 about the same main axis 210 by virture of the control lever 300 being engaged in the bore 240. When the ball 200 pivots about the main axis 210 it gives rise to translation displacement of the crosshead 600 parallel to the secondary axis 220 by driving it via the control finger 206. This translation displacement of the crosshead 600 may be used to control a toggle swith to switch between main beam and dipped beam headlights of a motor vehicle. Translation of the crosshead 600 may also be used for flashing the headlights.

Numerous arrangements of the toggle for main/-dipped beam switching or for flashing the headlights have already been described and any of them may be selected as appropriate. That is why these means are not described in greater detail in the present specification.

However, it can be seen on examining the accompanying figures that, in a preferred embodiment, the crosshead 600 includes a blade 610 for providing main/-dipped switching by means described in greater detail in the Applicants' French patent application filed Apr. 18, 1986. This French patent application, application number 86 05604, has been published as French Pat. No. 2597659. The corresponding U.S. Pat. is Pat. No. 4,748,298, issued on 5-31-88 to Louis J. Chretien.

The clevis 400 has a blind bore 450 about an axis which is parallel to the secondary axis 220. This bore 450 receives a contact stud 452 and a spring 454 urging the stud outwardly. The stud 452 projects out from the bore 450 and is urged against a set of blades 456 by the spring 454.

When the control lever 300 is pivoted about the secondary axis 220 it causes the ball 200 and the clevis 400 to pivot simultaneously about the secondary axis 220. Such pivoting about the secondary axis 220 causes the contact stud 452 to move over the set of blades 456. Thus, as the clevis 400 pivots about the secondary axis 220, the contact stud 452 interconnects various different pairs of fixed blades 456. This arrangement may be used in conventional manner to control the direction indicators or "flickers" of a motor vehicle.

The control lever 300 may also include a rod 310 capable of moving in translation parallel to its longitudinal axis 302 in order to operate a fourth function, preferably a horn for giving audible warning of approach, by acting on a set of blades 312, 314 which terminate respectively in movable and fixed contact portions.

The structure of the ball 200 and the means for guiding it about the axes 210 and 220 are now described in greater detail.

This description is made, in particular, with reference to accompanying FIG. 1A which is a detail in a view similar to FIG. 1 and showing the means provided in the housing 100 for guiding the ball 200.

The ball 200 may include a plurality of spherical outside surfaces of different diameters about a common center and cooperating with complementary concave spherical surfaces constituting the bearing 110.

As shown in the accompanying figures, the ball 200 has two spherical surfaces 241 and 242 which are respectively engaged against surfaces 114 and 112 which constitute the bearing 110.

The radius of the spherical surface 242 is greater than that of the surface 241.

The spherical surfaces 241 and 242 are interconnected by means of plane surfaces 224 and 246 in the form of rings centered on the main axis 210 and extending transversely relative thereto.

The surface 114 having a spherical envelope and provided on the cover plate 106 is essentially upwardly directed. It is complementary to the spherical surface 241 of the ball 200.

The surface 112 having a spherical envelope and likewise provided on the cover plate 106 is essentially directed towards the bottom cover plate 108. It is substantially complementary to the surface 242 of the ball 200.

As shown in FIG. 1A, the housing 100 also includes webs 121. They extend perpendicularly to the secondary axis 220. The top surfaces 122 of the webs 121 extending transversely to the axis 220 serve as thrust surfaces for the stub axles 212 and 214, or more particularly for the bottom generator lines thereof, i.e. the generator lines of the stub axles which are closest to the bottom cover plate 108.

In order to make this possible, the distance parallel to the secondary axis 220 between the center of the surface 114 and the point of intersection between the axis 220 and the plane defined by the surface 122 is equal to the radius of the diametrically opposite stub axles 212 and 214 on the ball 200.

By virtue of this disposition, and since the ball is pressed against the surfaces 114 and 112 of the housing by the springs 434 with the stub axles 212 and 214 resting against the surfaces 122 of the webs 121, the axis 210 of the stub axles, which is the main axis of the ball can be displaced only angularly about the axis 220 in a plane parallel to the surfaces 122, and as a result the secondary axis 220 is fixed.

Guidance of the ball 200 is reinforced by two ribs 124.

These ribs 124 are substantially cylindrical about an axis 126 which is orthogonal to the axes 210 and 220. More precisely, the inside surfaces of the ribs 126 which rest against the ball 200 are complementary to the spherical surface 242.

Further, a plane surface 250 is provided on the sleeve 208 and connects to the ball 200. In the rest position of the ball 200 (as shown in FIG. 1), the surface 250 is coplanar with the top surfaces 122 of the webs 121.

It may also be observed that the ends of the tines 404 and 406 have bearing surfaces 412 and 414 which are delimited by spherical envelopes 405 and 407. These have a common center coinciding with the center of the bearing surfaces 412 and 414.

The difference between the radiuses of the spherical surfaces 241 and 242 of the ball is not less than the thickness of the ends of the tines 404 and 406, i.e. to the radial distance referenced r in FIG. 2 between the spherical surfaces 405 and 412 or 407 and 414 of the clevis 400.

Finally, it may be observed that the spherical surfaces 241, 242, 412, 414, 405, 407, and 114 all have the same center. In addition, this center corresponds to the point of intersection between the axes 210, 220, and 302.

Naturally, the present invention is not limited to the particular embodiment described above but extends to any variant within the spirit of the invention.

I claim:

1. An electrical switch, in particular for motor vehicles, comprising:
    a housing provided with at least first, second, and third electrical contacts switching means, fixed with respect to said housing, for achieving first, second, and third switching operations respectively,
    a ball mounted to pivot relative to the housing about a main axis and a secondary axis, said main axis and secondary axis being transverse to one another and having an intersection corresponding to the center of the ball, said ball being moreover provided with a control finger which protrudes from the ball and a through channel which is transverse to said main axis and said secondary axis,
    a lever with a longitudinal axis received in said through channel so as to rotate freely about the longitudinal axis which is coaxial to the axis of said through channel, said lever being provided with an off-center peg, which is offset from the longitudinal axis, and
    a clevis carried by the ball to follow the ball when it pivots about said secondary axis while allowing the ball to pivot relative to the clevis when the ball is rotated about said main axis, so that:
    when the control lever is displaced in rotation about the longitudinal axis, said off-center peg actuates said first electrical contacts switching means to achieve said first switching operation,
    when the control lever is displaced in rotation about the main axis, said control lever displaces said ball in rotation about said main axis and said control finger actuates said second electrical contacts switching means to achieve said second switching operation, and
    when the control lever is displaced in rotation about said secondary axis, said control lever displaces said ball and said clevis in rotation about said secondary axis, and said clevis actuates said third electrical contacts switching means to achieve said third switching operation.

2. An electrical switch according to claim 1, wherein the housing is provided with a spherical bearing having a concave spherical bearing surface receiving the ball and guiding it to pivot about said secondary axis and said main axis while a resilient member is inserted between the housing and the clevis and urges the ball against said spherical bearing.

3. An electrical switch according to claim 2, wherein the resilient member urging the ball to press against the spherical bearing is inserted into a blind bore provided in said clevis, said resilient member being located between the bottom of the blind bore and a member which rests against a cam forming indexing surface which is fixed to the housing so that said member provides an indexing function for the clevis and the ball when they pivot together about said secondary axis.

4. An electrical switch according to claim 1, wherein the ball has at least one cylindrical stub axle which is coaxial with said main axis, and the clevis is provided with at least a concave cylindrical bearing surface which is complementary to the stub axle and rests against said stub axle in order to follow the ball when it pivots about said secondary axis while allowing relative pivoting to take place between the ball and the clevis when the ball is rotated about said main axis.

5. An electrical switch according to claim 4, wherein the ball has two diametrically opposite cylindrical stub axles which are coaxial with said main axis and the clevis is provided with two concave cylindrical bearing surfaces which are complementary to the stub axles and rest against said stub axles.

6. An electrical switch according to claim 1 including a resilient member inserted into a blind bore provided in the ball, said resilient member being located between the bottom of the blind bore and a member which rests against a cam-forming indexing surface which is fixed to the clevis in order to provide an indexing function between the clevis and the ball when the ball is made to pivot about said main axis.

7. An electrical switch according to claim 1 comprising a fourth electrical contacts switching means provided in proximity of the lever, wherein the lever is also capable of translation parallel to its longitudinal axis in order to actuate said fourth electrical contacts switching means and to operate a fourth switching operation.

8. An electrical switch for a motor vehicle according to claim 1, wherein said first switching operation achieved by rotation of the lever about its longitudinal axis serves to select between the following lighting conditions: off, sidelights, and headlights; said second switching operation achieved by pivoting said lever and said ball about said main axis serves to interchange the lighting conditions between main beam and dipped beam; and said third switching operation achieved by pivoting said lever, said ball and said clevis about said secondary axis serves to control the direction-indicator lights.

9. An electrical switch according to claim 1, wherein said off center peg provided on the lever co-operates with a fork fixed to a slide for causing the slide to move in translation when the lever is rotated about its longitudinal axis in order to actuate said first electrical contacts switching means and to achieve said first switching operation.

10. An electrical switch according to claim 1, wherein said control finger provided on the ball rests against a crosshead which is guided to move in translation inside the housing in such a manner that pivoting the lever and the ball about said main axis causes the crosshead to move in translation so as to actuate said second electrical contacts switching means and to achieve said second switching operation.

11. An electrical switch according to claim 1, wherein the housing is provided with a spherical bearing surface having a concave spherical bearing surface receiving the ball and guiding it to pivot about said secondary axis and said main axis, while a resilient member is inserted between the clevis and the ball and urges the ball against said spherical bearing.

* * * * *